Patented Apr. 13, 1926.

1,580,714

UNITED STATES PATENT OFFICE.

PAUL H. FALL, OF CARNEYS POINT, NEW JERSEY, AND IRA E. LEE, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF PRODUCING NAPHTHOL-SULPHONIC ACIDS.

No Drawing. Application filed June 30, 1920. Serial No. 393,113.

*To all whom it may concern:*

Be it known that we, PAUL H. FALL and IRA E. LEE, citizens of the United States, and residents of Carneys Point, in the county of Salem and State of New Jersey, and Wilmington, in the county of New Castle and State of Delaware, respectively, have invented a certain new and useful Process of Producing Naphthol-Sulphonic Acids, of which the following is a specification.

This invention relates to a process of producing naphthol-sulphonic acids from their corresponding sulphite esters, and consists essentially in heating an aqueous solution of such an ester to hydrolyze the same, and removing from the field of the reaction the acid resulting from the hydrolysis as fast as it is formed. More particularly our invention comprises boiling an aqeous solution of a sulphite ester of an alpha-naphthol-monosulphonic acid, such as the 1,4- and 1,5- naphtholsulphonic acids, with an alkaline earth metal hydroxide.

In the ordinary sulphite process for the preparation of 1-naphthol-4-sulphonic acid or 1-naphthol-5-sulphonic acid, both of which may be referred to generically as a naphthol-sulphonic acid having the substituents in alpha positions, the sodium salt of naphthionic acid (1-naphthylamine-4-sulphonic acid), or of Laurent's acid (1-naphthylamine-5-sulphonic acid) is dissolved in warm water, then the resulting solution is treated with a solution of sodium bisulphite by which the sulphite ester of 1-naphthol-4-sulphonic acid or 1-naphthol-5-sulphonic acid is formed, with practically 100% yield. The sulphite ester of 1-naphthol-4-sulphonic acid or 1-naphthol-5-sulphonic acid is then converted to 1-naphthol-4-sulphonic acid or 1-naphthol-5-sulphonic acid by hydrolysis with caustic soda with a maximum yield of about 90% of theory, provided at least three hydrolyses are carried out.

The steps in the conversion of the amino-naphthalene-sulphonic acid into the corresponding naphtol sulphonic acid, by means of the sulphite process, are made clear by the following equations:

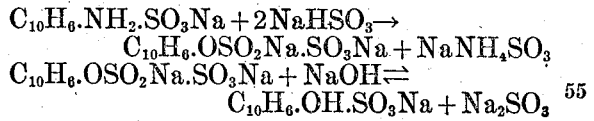

$$C_{10}H_6.NH_2.SO_3Na + 2NaHSO_3 \rightarrow$$
$$C_{10}H_6.OSO_2Na.SO_3Na + NaNH_4SO_3$$
$$C_{10}H_6.OSO_2Na.SO_3Na + NaOH \rightleftharpoons$$
$$C_{10}H_6.OH.SO_3Na + Na_2SO_3$$

The first of the steps in the process as given above, i. e., esterification, goes practically to completion, but the second one, hydrolysis of the sulphite ester to the corresponding oxy acid with caustic soda, comes to equilibrium long before the reaction is completed (about 65% completed) due to the accumulation of sodium sulphite in the solution. To destroy this equilibrium, so as to allow the reaction to go more nearly to completion, it is customary to boil the solution with hydrochloric acid until all sulphites have been expelled, then the solution is again boiled with caustic soda until a second equilibrium is reached (about 80% of the total ester converted to the oxy body), when the treatment with hydrochloric acid to expel sulphites is again repeated. A third treatment with caustic soda and hydrochloric acid brings the total conversion of the sulphite ester to the oxy body to about 90%. During the total hydrolysis there has been formed in solution about one part of salt to one part of oxy acid, so the reaction is usually stopped at this point. The total time for the above described hydrolysis is from four to five days.

We have now discovered that a remarkable increase in yield of naphthol-sulphonic acid, and decrease in time of hydrolysis, are obtained by carrying out the hydrolysis of the sulphite ester in the presence of an hydroxide—such as an alkaline earth metal hydroxide: calcium hydroxide, strontium hydroxide, barium hydroxide, etc.,—which is a fairly strong base and yet forms a sulphite which is almost insoluble in water. By the use of the above mentioned bases, we have been able to increase the yield of naphthol-sulphonic acid to practically 100% and to decrease the time required for hydrolysis to three hours.

Our invention may be illustrated in greater detail by the following example:

An aqueous solution of the sulphite ester of 1-naphthol-4-sulphonic acid, prepared in the well-known manner, above outlined, is brought to a boil and then there is added about one part of dry hydrate of lime for each 4.47 parts of the sulphite ester (i. e. for each 3.31 parts of sodium naphthionate used at the start). The resulting mixture is boiled for three hours, when the resulting calcium sulphite is filtered off and washed. The yield of 1-naphthol-4-sulphonic acid is in this case practically 100%, or an increase of about 10% over the maximum obtainable when caustic soda is used for the hydrolysis. Also the time for hydrolysis is reduced from 4 to 5 days with caustic soda to three hours with lime. (If barium or strontium hydroxide had been used instead of lime, any excess of base would be precipitated with soda ash and filtered off at this point; however, the extreme insolubility of lime in hot solution makes such a step unnecessary when it is used.) The 1-naphthol-4-sulphonic acid is then salted out or used directly for the manufacture of azo dyes.

Although the new process has been described above in considerable detail, it will be understood that conditions of operation may be changed to some extent without departing from our invention. Thus, the hydrolysis may be performed either above or below the normal boiling temperature of the solution; and the hydroxide may be added all at once, or gradually during the course of the reaction.

We claim:—

1. A process of producing a naphthol-sulphonic acid, which comprises hydrolyzing a sulphite ester of said naphthol-sulphonic acid, in the presence of a substance capable of reacting with sulphurous acid to form a sulphite relatively insoluble in water.

2. A process of producing an alpha-naphthol-sulphonic acid, which comprises heating a sulphite ester of said acid with a base which forms a sulphite almost insoluble in water.

3. A process of producing an alpha-naphthol-sulphonic acid, which comprises heating a sulphite ester of said acid with the hydroxide of a metal whose sulphite is relatively insoluble in water.

4. A process of producing an alpha-naphthol-sulphonic acid which comprises heating a sulphite ester of said acid with sufficient calcium hydroxide to convert all of the sulphite formed by hydrolysis into a sulphite of calcium.

5. A process of producing an alpha-naphthol-monosulphonic acid which comprises boiling an aqueous solution of a sulphite ester of said acid in the presence of an hydroxide of a divalent metal whose hydroxide is a fairly strong base.

6. A process of producing an alpha-naphthol-sulphonic acid which comprises heating a sulphite ester of said acid with an alkaline earth metal hydroxide.

7. A process of producing a naphthol-sulphonic acid which comprises hydrolyzing, in the presence of the hydroxide of a metal whose sulphite is relatively insoluble in water, an ester resulting from the combination of an alkali-metal bisulphite with a naphthyl-amine-sulphonate of an alkali-metal.

8. A process of producing a naphthol-sulphonic acid which comprises combining an alkali-metal bisulphite with a naphthyl-amine-sulphonate of an alkali-metal, and hydrolyzing the resulting ester by heating an aqueous solution thereof containing a sufficient amount of an alkaline earth metal hydroxide to react with substantially all of the sulphite formed by hydrolysis.

9. A process of producing 1,4-naphtholsulphonic acid which comprises heating the sulphite ester, resulting from the combination of an alkali-metal bisulphite with alpha-naphthyl-amine-4-sulphonic acid, in the presence of an alkaline earth metal hydroxide.

10. A process of producing a naphthol-sulphonic acid having the substituents in alpha positions which comprises heating the sulphite ester, resulting from the combination of an alkali-metal bisulphite with a naphthyl-amine-sulphonic acid having the substituents in alpha positions, in the presence of an alkaline earth metal hydroxide.

11. A process of producing 1,4-naphtholsulphonic acid which comprises heating the sulphite ester of said acid with calcium hydroxide.

12. The process which comprises hydrolyzing in the presence of water and an alkaline earth metal hydroxide, the compound formed by the combination of sodium bisulphite with sodium alpha-naphthylamine-sulphonate.

13. The process which comprises hydrolyzing, in the presence of an alkaline-earth metal hydroxide, the ester resulting from the combination of sodium bisulphite with sodium naphthionate.

In testimony whereof we affix our signatures.

PAUL H. FALL.
IRA E. LEE.